United States Patent
Cheng et al.

(10) Patent No.: US 7,842,435 B2
(45) Date of Patent: Nov. 30, 2010

(54) FUEL CELL WATER MANAGEMENT ENHANCEMENT METHOD

(75) Inventors: Yang-Tse Cheng, Rochester Hills, MI (US); Gayatri Vyas, Rochester Hills, MI (US); Mahmoud H. Abd Elhamid, Grosse Pointe Woods, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1253 days.

(21) Appl. No.: 10/978,979

(22) Filed: Nov. 1, 2004

(65) Prior Publication Data

US 2006/0093735 A1 May 4, 2006

(51) Int. Cl.
*H01M 8/04* (2006.01)

(52) U.S. Cl. .............. 429/535; 429/456; 429/457; 429/514; 429/518

(58) Field of Classification Search .............. None
See application file for complete search history.

(56) References Cited

U.S. PATENT DOCUMENTS

| | | | | |
|---|---|---|---|---|
| 5,384,167 | A * | 1/1995 | Nishiwaki et al. | 427/569 |
| 6,080,513 | A * | 6/2000 | Brugger et al. | 430/5 |
| 6,203,936 | B1 * | 3/2001 | Cisar et al. | 429/44 |
| 6,280,872 | B1 | 8/2001 | Ozaki et al. | |
| 6,296,964 | B1 * | 10/2001 | Ren et al. | 429/38 |
| 6,426,161 | B1 * | 7/2002 | Cisar et al. | 429/38 |
| 6,562,446 | B1 * | 5/2003 | Totsuka | 428/304.4 |
| 2002/0014597 | A1 * | 2/2002 | Koh et al. | 250/492.21 |
| 2004/0194626 | A1 * | 10/2004 | Chellappa et al. | 96/4 |
| 2004/0214110 | A1 * | 10/2004 | Kim et al. | 430/311 |
| 2004/0217011 | A1 * | 11/2004 | Strobel et al. | 205/343 |
| 2005/0130025 | A1 | 6/2005 | Kadowaki et al. | |
| 2006/0040164 | A1 * | 2/2006 | Vyas et al. | 429/34 |

FOREIGN PATENT DOCUMENTS

| | | | |
|---|---|---|---|
| JP | 04-220957 | * | 8/1992 |
| JP | 11250921 | | 9/1999 |
| JP | 2000182625 | | 6/2000 |
| JP | 2000251900 | | 9/2000 |
| JP | 2003068317 | | 3/2003 |
| JP | 2003123783 | | 4/2003 |
| JP | 2004171970 | | 6/2004 |

OTHER PUBLICATIONS

Yoon et al, ("The effect of topography on water wetting and micro/nano tribological characteristics of polymeric surfaces", Tribology Letter, vol. 15, No. 2, Aug. 2003).*

Choi et al, "Modification of proton conducting membrane for reducing methanol crossover in a direct methanol fuel cell", 2001, Journal of Power Sources, vol. 96, p. 411-414.*

* cited by examiner

*Primary Examiner*—Jennifer K. Michener
*Assistant Examiner*—Tony Chuo
(74) *Attorney, Agent, or Firm*—Reising Ethington P.C.

(57) ABSTRACT

A method of enhancing water management capabilities of a fuel cell is disclosed. The method includes providing a fuel cell component having hydrophilic or weakly hydrophobic surfaces, increasing a hydrophobicity of at least one of said hydrophilic surfaces and assembling the fuel cell component into the fuel cell.

9 Claims, 2 Drawing Sheets

FUEL CELL WATER MANAGEMENT ENHANCEMENT METHOD

FIELD OF THE INVENTION

The present invention relates to fuel cells which generate electricity to power vehicles or other machinery. More particularly, the present invention relates to a method of enhancing water management of fuel cells by using an ion beam to form super-hydrophobic surfaces on fuel cell components, thereby reducing retention of water on the surfaces and promoting transport of water in the fuel cell.

BACKGROUND OF THE INVENTION

Fuel cell technology is a relatively recent development in the automotive industry. It has been found that fuel cell power plants are capable of achieving efficiencies as high as 55%. Furthermore, fuel cell power plants emit only heat and water as by-products.

Fuel cells include three components: a cathode, an anode and an electrolyte which is sandwiched between the cathode and the anode and passes only protons. Each electrode is coated on one side by a catalyst. In operation, the catalyst on the anode splits hydrogen into electrons and protons. The electrons are distributed as electric current from the anode, through a drive motor and then to the cathode, whereas the protons migrate from the anode, through the electrolyte to the cathode. The catalyst on the cathode combines the protons with electrons returning from the drive motor and oxygen from the air to form water. Individual fuel cells can be stacked together in series to generate increasingly larger quantities of electricity.

In a Polymer-Electrolyte-Membrane (PEM) fuel cell, a polymer electrode membrane serves as the electrolyte between a cathode and an anode. The polymer electrode membrane currently being used in fuel cell applications requires a certain level of humidity to facilitate conductivity of the membrane. Therefore, maintaining the proper level of humidity in the membrane, through humidity/water management, is very important for the proper functioning of the fuel cell. Irreversible damage to the fuel cell will occur if the membrane dries out.

In order to prevent leakage of the hydrogen fuel gas and oxygen gas supplied to the electrodes and prevent mixing of the gases, a gas-sealing material and gaskets are arranged on the periphery of the electrodes, with the polymer electrolyte membrane sandwiched there between. The sealing material and gaskets are assembled into a single part together with the electrodes and polymer electrolyte membrane to form a membrane and electrode assembly (MEA). Disposed outside of the MEA are conductive separator plates for mechanically securing the MEA and electrically connecting adjacent MEAs in series. A portion of the separator plate, which is disposed in contact with the MEA, is provided with a gas passage for supplying hydrogen fuel gas to the electrode surface and removing generated water vapor.

Because the proton conductivity of PEM fuel cell membranes deteriorates rapidly as the membranes dry out, external humidification is required to maintain hydration of the membranes and sustain proper fuel cell functioning. Moreover, the presence of liquid water in automotive fuel cells is unavoidable because appreciable quantities of water are generated as a by-product of the electrochemical reactions during fuel cell operation. Furthermore, saturation of the fuel cell membranes with water can result from rapid changes in temperature, relative humidity, and operating and shutdown conditions. However, excessive membrane hydration results in flooding, excessive swelling of the membranes and the formation of differential pressure gradients across the fuel cell stack.

Because the balance of water in a fuel cell is important to operation of the fuel cell, water management has a major impact on the performance and durability of fuel cells. Fuel cell degradation with mass transport losses due to poor water management remains a concern for automotive applications. Long-term exposure of the membrane to water can also cause irreversible material degradation. Water management strategies such as the establishment of pressure and temperature gradients and counter flow operation have been implemented and have been found to reduce mass transport to some degree, especially at high current densities. However, optimum water management is still needed for optimum performance and durability of a fuel cell stack.

It is known that various surface features, such as faceted periodic surface structures in the form of pyramidal arrays, can be made by ion bombardment-induced sputtering on the surfaces of metals. Furthermore, an increase in surface area at the nanometer and micrometer length scales is the key to making super hydrophobic surfaces. Accordingly, the present invention proposes a method of enhancing fuel cell water management by surface modification of fuel cell components through ion bombardment of the surfaces. This creates super-hydrophobic surfaces which repel water, reducing retention of water on the surfaces and promoting mass transport of oxygen and water in the fuel cell.

SUMMARY OF THE INVENTION

The present invention is generally directed to a PVD method of enhancing the water management capabilities of a fuel cell by creating hydrophobic surfaces on the various components, particularly the polymer electrolyte membrane (PEM) and bipolar plate components, of the fuel cell. The method includes ion bombardment-induced sputtering of atoms from the fuel cell component surfaces to roughen the surfaces at the nanometer to micrometer length scale. The high surface area created by ion bombardment on the surfaces increases the hydrophobicity of the surfaces to reduce retention of water on the surfaces and promote transport of water in the fuel cell.

BRIEF DESCRIPTION OF THE DRAWINGS

The invention will now be described, by way of example, with reference to the accompanying drawings, in which.

DETAILED DESCRIPTION OF THE INVENTION

The present invention contemplates a PVD method of enhancing the water management capabilities of a fuel cell by rendering hydrophobic surfaces of various fuel cell components, particularly the polymer electrolyte membrane (PEM) and metal bipolar plate components of the fuel cell. According to the method, atoms are sputtered from the surface of the fuel cell component by directing high-energy ions against the surface. Consequently, surface pits having a width at the nanometer to micrometer length scale are formed in the surface. This roughens and creates a high surface area on the surface, thereby increasing the hydrophobicity of the surface. Consequently, in operation of the fuel cell, retention of water on the surface is substantially reduced. This promotes the transport of product water from the cathode to the bipolar plate, and eventually, from the fuel cell.

Figure 1:
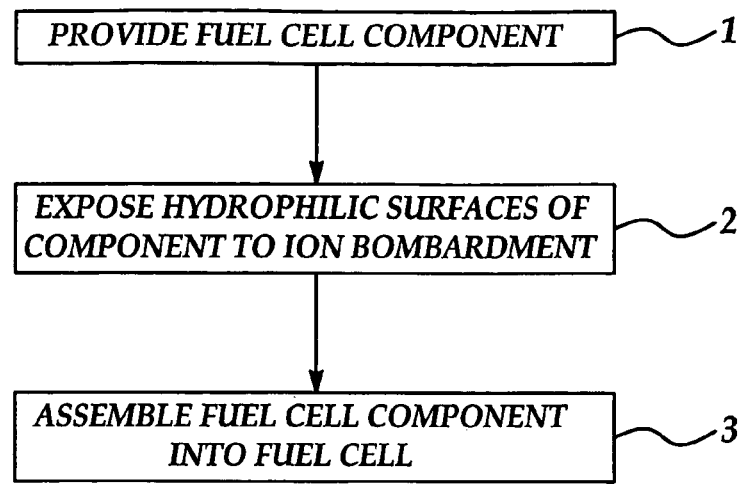
FIG. 1 is a flow diagram illustrating sequential process steps carried out according to the fuel cell water management enhancement method of the present invention.

Referring initially to the flow diagram of FIG. 1, in conjunction with the schematic diagrams of FIGS. 2 and 3, the fuel cell water enhancement method of the present invention is carried out typically as follows. In step 1, a fuel cell component having hydrophilic surfaces is provided. Alternatively, the surfaces of the fuel cell may be weakly hydrophobic. In typical application, the fuel cell component is a metal bipolar plate or a polymer electrolyte membrane (PEM). The bipolar plate and PEM have hydrophilic surfaces or weakly hydrophobic surfaces which normally tend to bind or retain water molecules during operation of a fuel cell. This results in excessive accumulation of water in the fuel cell and contributes to mass transport losses of reactants and reaction products, thus diminishing the performance capabilities of the fuel cell. However, it is understood that the present invention contemplates the treatment of those fuel cell components other than or in addition to the bipolar plate and/or the PEM which have a hydrophilic or weakly hydrophobic surface or surfaces that would tend to retain water during fuel cell operation.

In step 2, the hydrophilic or weakly hydrophobic surface or surfaces of the fuel cell component is/are subjected to bombardment by high-energy ions. This may be carried out using a conventional ion bombardment process. In a typical ion bombardment process, an energetic ion beam of a few tens to several hundred kilo electron volts (keV) impinges on the surface of the component. Each ion in the ion beam is capable of dislodging several atoms upon striking the surface. Some of these dislodged atoms are ejected, or sputtered, from the surface. The sputtering rate is usually defined as the number of ejected atoms per ion and is a function of crystal orientation, the presence of impurities on the surface, grain boundaries, and extended defects (such as dislocations) created under the surfaces by ion bombardment, as well as the energy, direction and types of ions directed against the surface.

Figure 2:
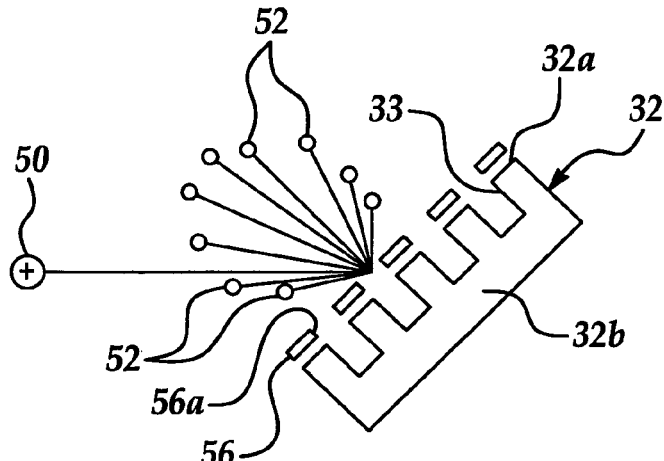
FIG. 2 is an enlarged sectional view of a bipolar plate of a fuel cell, illustrating ion bombardment of a surface on the bipolar plate to form faceted surface features in the surface and render the surface hydrophobic according to the method of the present invention.

The ion bombardment process for rendering hydrophobic the hydrophilic surfaces or increasing the hydrophobicity of the weakly hydrophobic surfaces 32a of a bipolar plate 32 of a fuel cell is shown in FIG. 2. The bipolar plate 32 includes a bipolar plate body 32b having at least one, and typically, multiple hydrophilic surfaces 32a. Accordingly, positive ions 50 are accelerated against a bipolar plate surface 32a of the bipolar plate 32. The positive ions 50, which have ion energies of from a few tens to several hundred kilo electron volts (keV), strike the surface 32a and dislodge metal atoms 52 from the surface 32a. Some of these metal atoms 52 are ejected from the surface 32a, forming surface pits 33 in the surface 32a. The surface pits 33 are the result of non-uniform sputtering of the metal atoms 52 from the surface 32a. The surface pits 33 typically have a length or width and depth of magnitude on the nanometer and micrometer scale. A typical width of each of the surface pits 33 is about 100 µm, and a typical depth of each of the surface pits 33 is about 146 µm. Collectively, the surface pits 33 increase the surface area of the surface 32a at the nanometer and micrometer length scale, rendering the surface 32a super-hydrophobic. The ion bombardment process can be carried out on all of the surfaces 32a of the bipolar plate body 32b to render those surfaces hydrophobic.

A shadowing mask 56 having mask openings 56a may be placed over the bipolar plate surface 32a to define the size and pattern of the surface pits 33 to be cut in the bipolar plate surface 32a, as is known by those skilled in the art. Accordingly, portions of the bipolar plate surface 32a which are exposed by the mask openings 56a are struck by the ions 50, which dislodge the metal atoms 52 from those portions. Those portions of the bipolar plate surface 32a which are covered by the shadowing mask 56 are protected from the ions 50, such that the sizes and positions of the surface pits 33 in the bipolar plate surface 32a are defined by the mask openings 56a.

Figure 3:
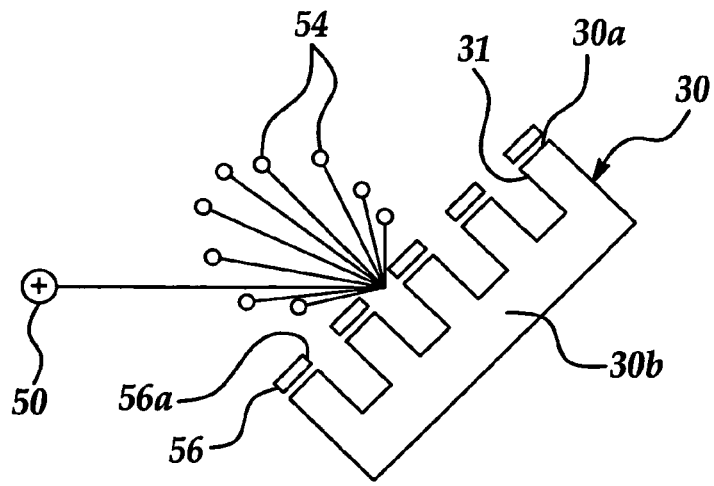
FIG. 3 is an enlarged sectional view of a polymer electrolyte membrane (PEM) of a fuel cell, illustrating ion bombardment of a surface on the PEM to form faceted surface features in the surface and render the surface hydrophobic according to the method of the present invention.
Figure 4:
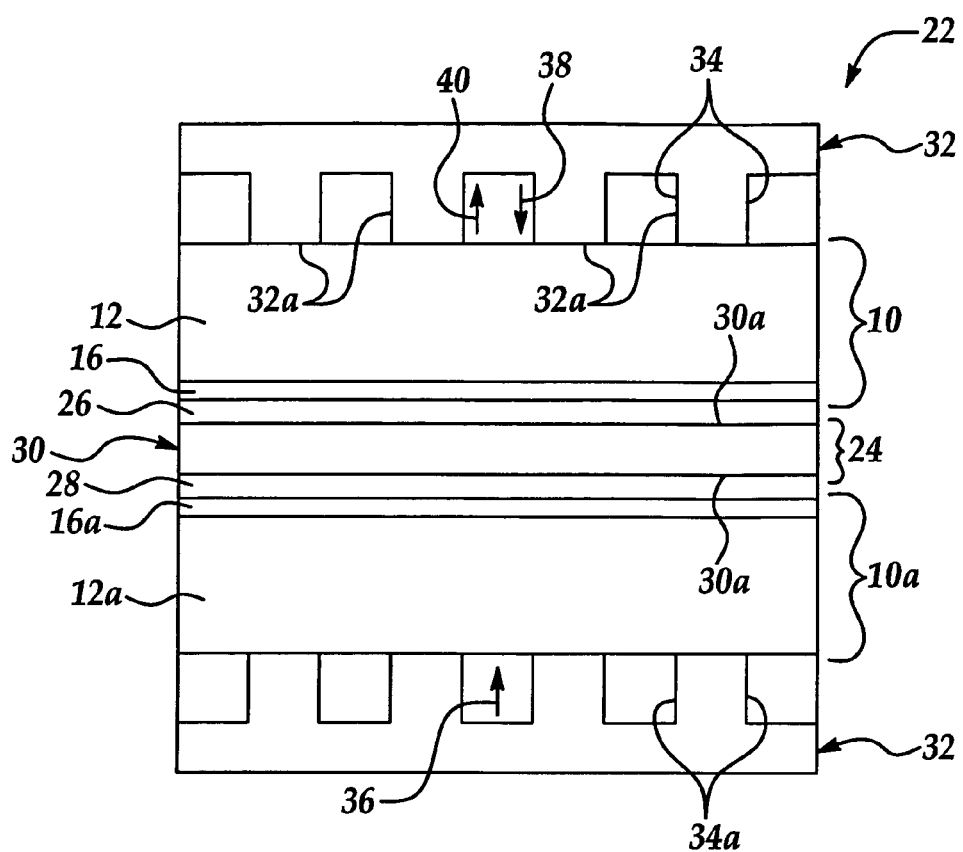
FIG. 4 is a schematic view of a fuel cell stack having a bipolar plate and a PEM subjected to the ion bombardment process shown in FIGS. 2 and 3.

FIG. 3 illustrates a similar ion bombardment process for rendering hydrophobic the surfaces 30a of a polymer electrolyte membrane (PEM) 30 of a fuel cell. The PEM 30 includes a PEM body 30b having at least one, and typically, multiple hydrophilic surfaces 30a. As positive ions 50 accelerated against the hydrophilic surface 30a of the PEM 30 strike the surface 30a, polymer atoms 54 are dislodged from the surface 30a. Some of these polymer atoms 54 are ejected from the surface 30a, forming surface pits 31 in the surface 30a. The surface pits 31 have a length or width of magnitude on the nanometer and micrometer scale, as heretofore noted with respect to the surface pits 33 in the bipolar plate surfaces 32a of the bipolar plate 32. A shadowing mask 56 having mask openings 56a may be placed over the bipolar plate surface 30a to define the size and pattern of the surface pits 31, as heretofore described. In step 3 of FIG. 1, the fuel cell components, including the bipolar plate 32 and PEM 30 treated according to step 2, are assembled into a fuel cell. The ion bombardment process can be carried out on all of the surfaces 30a of the PEM body 30b to render those surfaces hydrophobic.

Other Physical vapor deposition techniques like sputtering, plasma etching, ion-beam-assisted depositions or ionized cluster beam deposition may also be used to obtain the roughness levels as observed by the ion beam bombardment.

The bipolar plate elements may be coated with electrically conductive ultra-thin layer of Au. Thin films obtained by ion assisted deposition would imitate the surface roughness created by ion bombardment prior to the deposition.

Other conductive elements may also be coated as defined in a copending application, attorney docket number GP-304968, assigned to the common assignee of the present invention.

Figure 5:
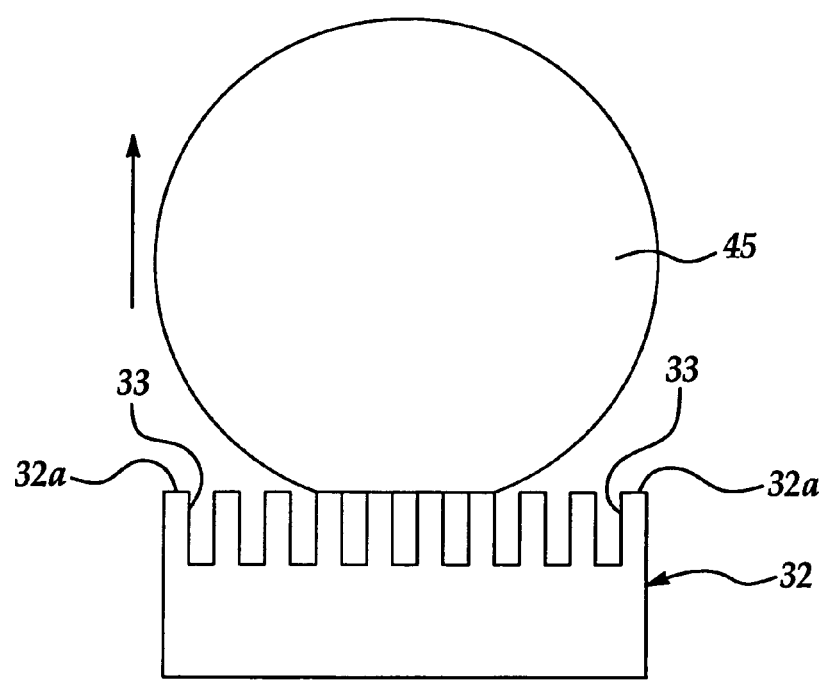
FIG. 5 is an enlarged cross-sectional view of the bipolar plate subjected to the ion bombardment process of FIG. 2, illustrating hydrophobicity of the surfaces on the bipolar plate.

During operation of the fuel cell 22, hydrogen gas 36 flows through the field flow channels 34a of the bipolar plate 32a and diffuses through the gas diffusion medium 10a to the anode 28. In like manner, oxygen 38 flows through the field flow channels 34 of the bipolar plate 32 and diffuses through the gas diffusion medium 10 to the cathode 26. At the anode 28, the hydrogen 36 is split into electrons and protons. The electrons are distributed as electric current from the anode 28, through a drive motor (not shown) and then to the cathode 26. The protons migrate from the anode 28, through the PEM 30 to the cathode 26. At the cathode 26, the protons are combined with electrons returning from the drive motor and oxygen 38 to form water vapor 40. The water vapor 40 diffuses from the cathode 26, through the gas diffusion medium 10 into the field flow channels 34 of the bipolar plate 32 and is discharged from the fuel cell stack 22. During transit of the water vapor 40 from the cathode 26 to the bipolar plate 32 and beyond, the hydrophobic PEM surfaces 30a of the PEM 30 and the bipolar plate surfaces 32a of the bipolar plate 32 repel moisture. This is shown in FIG. 5, in which a water droplet 45 is repelled by the hydrophobic bipolar plate surface 32a of the bipolar plate 32. Such repulsion of moisture by the PEM surfaces 30a and bipolar plate surfaces 32a enhances mass transport of the reactant oxygen 38 to the PEM 30 and by-product water vapor 40 from the PEM 30, thus enhancing the water management capability of the fuel cell 22.

While the preferred embodiments of the invention have been described above, it will be recognized and understood that various modifications can be made in the invention and the appended claims are intended to cover all such modifications which may fall within the spirit and scope of the invention.

What is claimed is:

1. A method of enhancing water management capabilities of a fuel cell, comprising:
    providing a bipolar plate having at least one metal surface that is hydrophilic or weakly hydrophobic;
    providing an ion beam; and
    directing said ion beam against at least a portion of said at least one metal surface to sputter atoms from said at least one metal surface and form a plurality of surface pits thereon that render said at least a portion of said at least one metal surface more hydrophobic.

2. The method of claim 1 wherein each of said plurality of surface pits has a plurality of widths and depths at the nanometer to micrometer length scale.

3. The method of claim 1 further comprising:
    providing a shadowing mask having a plurality of mask openings over said at least one surface to define a size and pattern of said at least a portion of said at least one surface that said ion beam is directed against through said plurality of mask openings.

4. A method of enhancing water management capabilities of a fuel cell, comprising:
    providing a bipolar plate having at least one metal surface that is hydrophilic or weakly hydrophobic;
    rendering more hydrophobic at least a portion of said at least one metal surface that is hydrophilic or weakly hydrophobic by directing an ion beam against said at least a portion of said at least one metal surface to sputter atoms from said metal surface and form a plurality of surface pits thereon, said surface pits having a width and a depth at the nanometer to micrometer length scale, wherein the depth is greater than the width; and
    assembling said bipolar plate into said fuel cell.

5. The method of claim 4 further comprising:
    providing a shadowing mask having a plurality of mask openings over said at least one metal surface that is hydrophilic or weakly hydrophobic to define a size and pattern of said at least a portion of said at least one metal surface; and
    directing said ion beam against said at least a portion of said at least one metal surface that is hydrophilic or weakly hydrophobic through said plurality of mask openings.

6. The method of claim 4 wherein the fuel cell is a hydrogen fuel cell.

7. The method of claim 4 wherein the step of assembling includes assembling said bipolar plate into a cathode side of said fuel cell such that said bipolar plate comes into contact with fuel cell reaction product during operation of the fuel cell.

8. The method of claim 7 wherein the fuel cell reaction product includes water and the step of rendering more hydrophobic increases the hydrophobicity of said at least a portion of said at least one metal surface sufficiently to promote transport of the water out of the fuel cell.

9. The method of claim 3 wherein each of said plurality of mask openings defines a size of each of the plurality of surface pits.

* * * * *